United States Patent [19]

Oshima et al.

[11] 4,144,417

[45] Mar. 13, 1979

[54] ECHO CANCELLING SYSTEM

[75] Inventors: Shintaro Oshima, Musashino; Akira Sato, Tokyo, both of Japan

[73] Assignee: Kokusai Denshin Denwa Kabushiki Kaisha, Japan

[21] Appl. No.: 852,782

[22] Filed: Nov. 18, 1977

Related U.S. Application Data

[63] Continuation of Ser. No. 663,061, Mar. 2, 1976, abandoned.

[30] Foreign Application Priority Data

Mar. 7, 1975 [JP] Japan ................................ 50-27068

[51] Int. Cl.$^2$ ............................................. H04B 3/22
[52] U.S. Cl. ................................................ 179/170.2
[58] Field of Search ................. 179/170.2, 170.6, 170.8

[56] References Cited

U.S. PATENT DOCUMENTS

| Re. 28,919 | 7/1976 | Berkley et al. | 179/170.8 |
| 3,499,999 | 3/1970 | Sondhi | 179/170.2 |
| 3,500,000 | 3/1970 | Kelly, Jr. et al. | 179/170.2 |
| 3,588,385 | 6/1971 | Moye | 179/170.2 |
| 3,699,271 | 10/1972 | Berkley et al. | 179/170.6 |

*Primary Examiner*—William C. Cooper
*Assistant Examiner*—Randall P. Myers
*Attorney, Agent, or Firm*—Robert E. Burns; Emmanuel J. Lobato; Bruce L. Adams

[57] ABSTRACT

An echo cancelling system, in which a pseudo-echo is provided by producing an impulse response of an echo path, reversed in phase and then applied to a subtractor of the echo path to cancel an echo. A low level reference signal, such as random noise or an artificial random signal, is continuously applied to the echo path and successively delayed by a sampling period to obtain a plurality of delayed reference signals, which are multplied by the output of the subtactor to obtain a plurality of multiplied outputs. The multiplied outputs are integrated by integrators and then amplified by high gain amplifiers to be employed for producing the psuedo-echo. As a result of such construction of the adaptive control loop, the convergence time for cancellation is effectively improved.

4 Claims, 3 Drawing Figures

4,144,417

ECHO CANCELLING SYSTEM

This is a continuation, of application Ser. No. 663,061, filed Mar. 2, 1976 now abandoned.

FIELD OF THE INVENTION

This invention relates to an echo cancelling system, in which a pseudo-echo is provided by producing an impulse response to an echo path, reversed in phase and then applied to the echo path to thereby cancel an echo.

BRIEF DESCRIPTION OF PRIOR ART

In conventional adaptive echo cancelling systems, the convergence time for cancellation is long. This leads to such a disadvantage that the resulting non-cancelled echo disturbs a talker as a residual echo. In another conventional system, adaptive control is not employed, so that a reference impulse response of the echo path and a pseudo-echo is reproduced to thereby cancel the echo. Since the impulse response determined at the beginning of talking is also used during talking, this system is defective in that if the impulse response fluctuates during talking, the echo is not cancelled in an amount corresponding to the amount of fluctuation.

SUMMARY OF THE INVENTION

To overcome such defects of the prior art, this invention, provides an echo cancelling system which is capable of sharply improving the convergence time for cancellation by the use of a low level reference signal and by the provision of amplifiers of sufficiently large gain in the adaptive control loop.

BRIEF DESCRIPTION OF THE DRAWINGS

The principle, construction and operation of this invention will be clearly understood from the following detailed description taken in conjunction with the accompanying drawings, in which.

DETAILED DESCRIPTION OF THE INVENTION

To make differences of this invention from a conventional system clear, a conventional echo cancelling system will first be described with reference to FIGS. 1 and 2.

Figure 1:
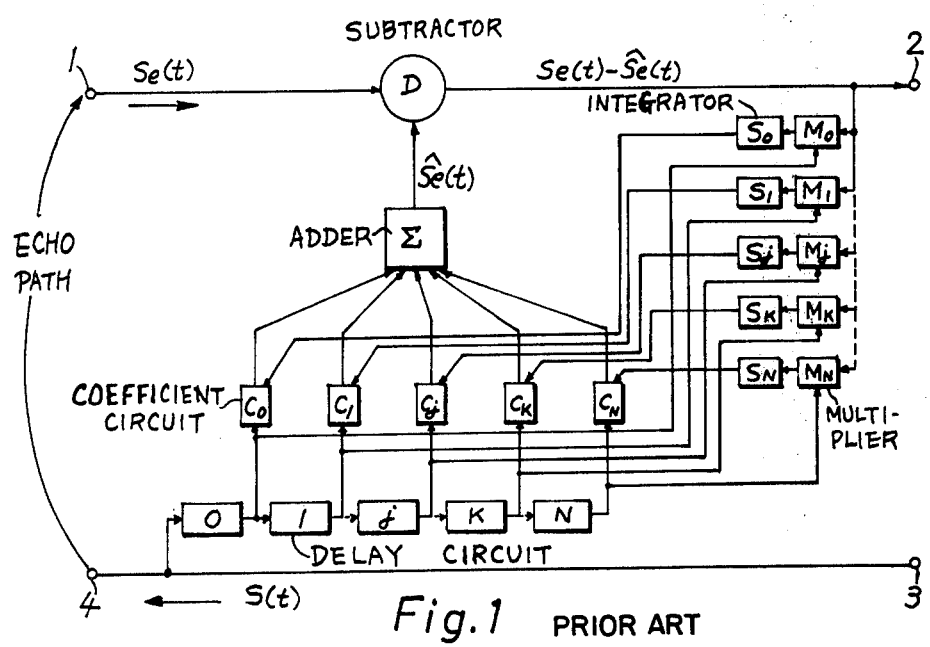
FIG. 1 is a block diagram explanatory of a conventional echo cancelling system.
Figure 2:
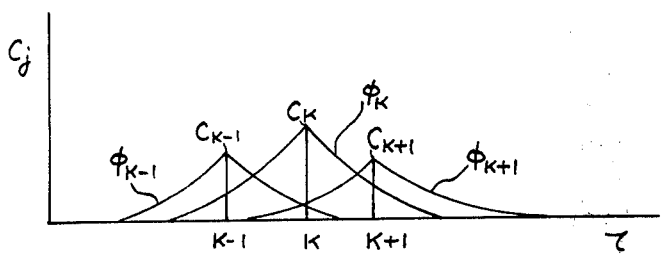
FIG. 2 shows characteristic curves explanatory of the operation of the conventional system; and operation of the conventional system.

In FIG. 1, an echo passes from a receiving output 4 to a transmitting input 1 through an echo path including a four-wire to two-wire conversion circuit and a telephone set. In FIG. 1, numerals $0, 1, \ldots j, \ldots k, \ldots n$ show delay circuits for successively delaying the received input signal $S(t)$ by its sampling intervals $(\tau)$, and the kth output indicates a delay of $k \cdot \tau$. Reference characters $C_0, C_1, \ldots C_j, \ldots C_k, \ldots C_n$ represent coefficient circuits, which are respectively capable of indicating an impulse response produced with $j \cdot \tau$ and $C_j (j = 0, \ldots n)$. Reference character $\Sigma$ refers to an adder circuit for obtaining the synthesis $$\sum_{j=0}^{n} C_j S(t - j\tau)$$

of the output $C_j S(t - j\tau)$ of the coefficient circuits $C_j$ ($j = 0 \ldots n$). Accordingly, the output $\hat{S}e(t)$ from the adder circuit $\Sigma$ corresponds to an output (a pseudo-echo) obtained after the received input signal $S(t)$ has passed through a circuit having an impulse response like that produced by the delay circuits, coefficient circuits and adder. Reference character D designates a subtractor, which effects a subtraction between the actual echo $Se(t)$ and the pseudo-echo $\hat{S}e(t)$. Reference characters $M_0, M_1, \ldots$ with the pairs $M_j, \ldots M_k, \ldots M_n$ indicate multipliers, and $S_0, S_1, \ldots S_j, \ldots S_k, S_n$ denote integrators, $M_j$ and $S_j$ ($j = 0, \ldots n$) making up $(n + 1)$ correlators. One of the inputs to the multiplier $M_k$ ($k = 0, \ldots N$) is a difference between the actual echo $Se(t)$ and the pseudo-echo $\hat{S}e(t)$, and the other input is the output from the Kth delay circuit ($k = 0, \ldots n$). If $C_k$ ($k = 0, \ldots n$) is an actual impulse response, the outputs from the $(n + 1)$ correlators are all zero. Conversely, if the coefficient circuits $C_k$ ($k = 0, \ldots n$) respectively connected to the $(n + 1)$ correlators are controlled so that the outputs from the correlators are all zero, the outputs from the coefficient circuits $C_k$ ($k = 0, \ldots n$) approach the true $C_k$ ($k = 0, \ldots n$) of the actual echo path. Accordingly, echo cancellation is achieved by actuating the adaptive control loop for obtaining the optimum $C_k$ ($k = 0, \ldots n$).

Under such a construction, when $C_k$ ($k = 0, \ldots n$) is controlled by the received input signal $S(t)$, the influence of the coefficient circuit $C_j$ ($j = 0, \ldots n$, $j \neq k$) other than the coefficient circuit $C_k$ is exerted. In this case, since the received signal is a talking voice, the autocorrelation coefficient $\Phi_k$ of the talking voice is superimposed on the actual impulse response $C_k$ is shown in FIG. 2 and, as a result of this, the actual impulse response $C_k$ is not provided. Accordingly, the actual impulse response is subject to the influence of the coefficient circuit $C_j$ (j is not equal to k) corresponding to the autocorrelation coefficient of the talking voice so that $C_k$ and $C_j$ ($j \neq k$) cannot be controlled independently of each other. Moreover, since they are influenced by each other, the convergence time for cancellation becomes longer.

Figure 3:
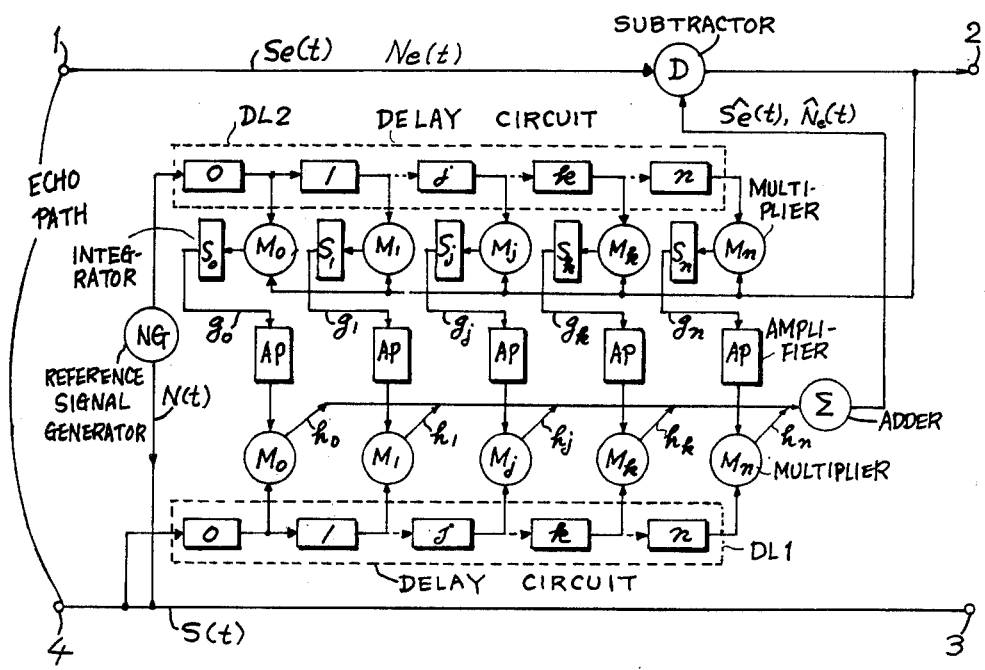
FIG. 3 is a block diagram illustrating an embodiment of this invention in which noise is used as a reference signal.

The invention will hereinafter be described in detail. With reference to FIG. 3 illustrating an embodiment of this invention, reference numeral 1 indicates a transmitting input; 2 designates a transmitting output; 3 denotes a receiving input; and 4 identifies a receiving output. An echo is applied from the receiving output 4 to the transmiting input 1 through an echo path including a four-wire to two-wire conversion circuit and a telephone set. Reference character NG represents a reference signal generator, and reference numerals 0, 1, ... j, ... n refer to delay circuits (corresponding to shift registers in digital processing) for successively delaying a received input signal $S(t)$ and a reference signal $N(t)$ by their sampling intervals $\tau$. The kth output is delayed by an amount $k \cdot \tau$. Reference characters $M_0, M_1, \ldots M_j, \ldots M_n$ shows multipliers; $S_0, S_1, \ldots S_j, \ldots S_k, \ldots S_n$ designates integrators; $h_0, h_1, \ldots h_j, \ldots h_k, \ldots h_n$ denote respective produced impulse responses; and AP represents an amplifier of sufficiently large gain A. The delay circuit DL2, the multipliers $M_o, \ldots M_n$, and the integrators $S_o, \ldots S_n$ form $(n + 1)$ correlators, or correlation means. The reference signal, having a low level in comparison with that of signal S(t) received from the receiving input, is continuously applied to a receiving line between the terminals 3 and 4 and to a broken-lined delay circuit DL1 (which) will hereinafter be referred to as the data register since a received signal (i.e. a talking voice) is also applied to this delay circuit) but, at the same time, it is also applied to a broken-lined delay circuit DL2 (which will hereinafter be referred to as the reference signal register).

At first, let it be assumed that the received signal S(t) does not exist.

The output from the reference signal generator NG is taken as N(t), and an echo of the reference signal N(t) is taken as Ne(t). The output N(t) is such that when it is delayed by its sampling interval $\tau$, the respective sampled outputs are not correlated to one another. That is, the output N(t) is, for example, random noise or an artificial random signal. Namely, assume that it is such a signal expressed by the following equation:

$$\lim_{T \to \infty} \frac{1}{2T} \int_{-T}^{T} N(t - j\tau)N(t - k\tau)dt = C(\text{Constant}) \dots j = k \\ = 0 \dots\dots\dots\dots j \neq k \quad (1)$$

On the other hand, the actual echo Ne(t) is as follows:

$$Ne(t) = \sum_{j=0}^{n} k_j N(t - j\tau) \quad (2)$$

where $k_j$ is an actual impulse response. A pseudo-echo $\hat{Ne}(t)$ is given by the following equation:

$$\hat{Ne}(t) = \sum_{j=0}^{n} h_j N(t - j\tau) \quad (3)$$

From FIG. 3, the output $g_k$ from the kth integrator $S_k$ is as follows:

$$g_k = \lim_{T \to \infty} \frac{1}{2T} \int_{-T}^{T} \{Ne(t) - \hat{Ne}(t)\}N(t - k\tau)dt \quad (4)$$

Accordingly, since $h_k$ is A-times $g_k$, it follows that $$h_k = A[\lim_{T \to \infty} \frac{1}{2T} \int_{-T}^{T} \{Ne(t) - \hat{Ne}(t)\}N(t - k\tau)dt] \quad (5)$$

Substituting the equations (2) and (3) into the equation (5), it follows that $$h_k = A[\lim_{T \to \infty} \frac{1}{2T} \int_{-T}^{T} \{\sum_{j=0}^{n} k_j N(t - j\tau) \\ - \sum_{j=0}^{n} h_j N(t - j\tau)\} \cdot N(t - K\tau)dt]$$

Substituting the equation (1) into this equation, it follows that $$h_k = A \cdot \lim_{T \to \infty} \frac{1}{2T} [\int_{-T}^{T} k_k N^2(t - k\tau)dt$$

$$- \int_{-T}^{T} h_k N^2(t - k\tau)dt]$$

Accordingly, $$h_k = A \cdot C[k_k - h_k] \dots \quad (5a)$$

If the equation (5a) is modified, it follows that $$h_k = \frac{A \cdot C}{1 + A \cdot C} k_k$$

If the gain A becomes infinity, $$h_k = \lim_{A \to \infty} \frac{A \cdot C}{1 + A \cdot C} k_k = \lim_{A \to \infty} \frac{1}{\frac{1}{A \cdot C} + 1} k_k$$

Since C is a constant, it follows that $$h_k = \lim_{A \to \infty} \frac{1}{\frac{1}{A \cdot C} + 1} k_k = k_k \quad (6)$$

Accordingly, by employing the system construction of FIG. 3 and sufficiently increasing the gain A of the amplifier AP (for example, about 40dB), it is possible to obtain an impulse response which is substantially equal to the actual impulse response.

When the next received input S(t) enters, if an echo of the received input signal S(t) is taken as Se(t), the equation (4) becomes as follows:

$$h_k = A \cdot \lim_{T \to \infty} \frac{1}{2T} \int_{-T}^{T} \{Ne(t) - \hat{Ne}(t) + Se(t) - \hat{Se}(t)\}N(t - K\tau)dt \quad (7)$$

On the other hand, the echo Se(t) of the received input S(t) is as follows:

$$Se(t) = \sum_{j=0}^{n} k_j S(t - j\tau)$$

Further, the pseudo-echo $\hat{Se}(t)$ becomes as follows:

$$\hat{Se}(t) = \sum_{j=0}^{n} h_j S(t - j\tau)$$

Substituting it into the equation (6), it follows that $$h_k = A \cdot \lim_{T \to \infty} \frac{1}{2T} [\int_{-T}^{T} \{Ne(t) - \hat{Ne}(t)\} N(t - k\tau)dt \\ + \int_{-T}^{T} \{\sum_{j=0}^{n} k_j S(t - j\tau) - \sum_{j=0}^{n} h_j S(t - j\tau)\} N(t - K\tau)dt]$$

Since the first term is the same as the equation (4), it follows that $$h_k = A \cdot C(k_k - h_k) \\ + A^1 \cdot \lim_{T \to \infty} \frac{1}{2T} \int_{-T}^{T} \sum_{j=0}^{n} (k_j - h_j)S(t - j\tau) N(t - k\tau)dt \quad (8)$$

-continued

If $\lim_{T \to \infty} \frac{1}{2T} \int_{-T}^{T} \sum_{j=0}^{n} (k_j - h_j) S(t - j\tau) N(t - k\tau) dt = \delta$, $h_k = A \cdot C(k_k - h_k) + A \cdot \delta$ If the gain A becomes infinity, $$h_k = \lim_{A \to \infty} \{ \frac{A \cdot C}{1 + A \cdot C} k_k + \frac{A \cdot C}{1 + A \cdot C} \delta \} = k_k + \delta \quad (9)$$

However, since S(t) and N(t) are not correlated to each other, $\delta \approx 0$ and the equation (9) results in the equation (6) which is given in the absence of the received input. This indicates that even if a received voice is applied to this system, the reproduced impulse response is not disturbed.

Next, in a case where the received input exists, if the transmitted input is taken as T(t), the equation (7) becomes as follows:

$$h_k = A \cdot \lim_{T \to \infty} \frac{1}{2T} \int_{-T}^{T} \{Ne(t) - \hat{Ne}(t) + Se(t) - \hat{Se}(t) + T(t)\} N(t - k\tau) dt$$

and the equation (8) becomes as follows:

$h_k = A \cdot C(h_k - \hat{h}_k) + A \cdot \delta + A \cdot \alpha$ where $$\alpha = \lim_{T \to \infty} \frac{1}{2T} \int_{-T}^{T} T(t) N(t - k\tau) dt$$

And the equation (9) becomes as follows:

$h_k = k_k + \delta + \alpha \ldots$ (10)

However, since T(t) and N(t) are not correlated to each other, $\alpha \approx 0$ and the equation (10) results in the equation (6) in the same manner as the equation (9) results in the equation (6). This indicates that, even if the transmitted input exists, the artificial impulse response is not disturbed.

Accordingly, the system of this invention enables cancellation of received voices at the transmission path in a stable state.

Under such a construction and an operation, if use is made of a reference signal satisfying the aforementioned equation (1), $h_k(k = 0, \ldots n)$ can be obtained without being influenced by the outputs other than k, so that the convergence time for the cancellation is extremely hastened in comparison with that obtainable with the prior art system. In practice, however, the reference signal used need not always completely satisfy the equation (1) but it is sufficient to use such a signal that when it is delayed by the sampling interval $\tau$, the resulting correlated output is lowered about 20dB. Further, since the reference signal reaches the talker, it is desired to be such a continuous noise as shown in the example of this invention and it is preferred to be of such a low level as not to disturb the talking voice signal. In this case, if the integration time is selected long enough to follow fluctuations in the echo path, it is possible to obtain an impulse response without the influence of external disturbance even in case of a low-level noise. Moreover, the use of the adaptive control loop provides such an advantage that fluctuations in the circuits of the loop can be alleviated.

As has been described in the foregoing, since the present system employs such a low level reference signal as described above and amplifiers of large amplification gain in the adaptive control loop, an impulse response of the echo path can be obtained by one or several operation cycle and, accordingly, the convergence time for the cancellation is extremely improved. Consequently, this invention has such an advantage that the echo disturbance in the prior art can be effectively eliminated.

What we claim is:

1. An echo cancelling system comprising:
   received signal output terminal means connected to an echo path for sending out received signals to the echo path;
   transmitted signal input terminal means connected to the echo path for receiving signals to be transmitted and receiving echo signals from the echo path;
   reference means connected to said received signal output terminal means for sending out into the echo path a reference signal which has a signal level sufficiently low so as not to disturb a received signal sent out by said received signal output terminal means and which has a small mutual correlation between the reference signal and the same delayed by a very short time;
   signal combining means connected to said transmitted signal input terminal means for subtracting a pseudo-echo from a true echo received from said echo path;
   correlation means connected to said reference means and said signal combining means and having a plurality of output leads for obtaining correlation signals representing correlation between said reference signal and the output of said signal combining means;
   amplification means including a plurality of amplifiers each having a large amplification gain and connected to a respective one of said plurality of output leads of said correlation means to receive the respective correlation signals from said correlation means for amplifying the correlation signals; and
   pseudo-echo producing means connected to said received signal output terminal means, said amplification means and said signal combining means for producing said pseudo-echo of the echo path from said signals sent-out to the echo path and from said amplified signals.

2. An echo cancelling system according to claim 1, in which said reference signal is random noise.

3. An echo cancelling system according to claim 1, in which said reference signal is an artificial random signal.

4. An echo cancelling system according to claim 1, in which said correlation means comprises delay means connected to said reference means for delaying said reference signal to obtain a plurality of delayed reference signals successively delayed by a sampling period, a plurality of multipliers connected in parallel to said signal combining means and each connected to receive a respective one of said delayed reference signals to multiply the output of said signal combining means by said delayed reference signals respectively to obtain a plurality of multiplied outputs, and a plurality of integrators each connected to a respective one of said multipliers for integrating said multiplied outputs to obtain integrated outputs employed as said correlation signals.

* * * * *